United States Patent [19]

Wentworth, Jr.

[11] 3,939,872

[45] Feb. 24, 1976

[54] PRESSURE TRANSFER UNIT

[75] Inventor: Robert S. Wentworth, Jr., Murrieta, Calif.

[73] Assignee: Borg-Warner Corporation, Chicago, Ill.

[22] Filed: Oct. 17, 1973

[21] Appl. No.: 407,364

[52] U.S. Cl. .................... 138/31; 138/30; 92/130 C; 137/494; 239/89; 239/96

[51] Int. Cl. .......................... F16l 51/02; F16l 55/04

[58] Field of Search ............ 138/30, 31; 239/89, 96; 222/453; 92/98, 49, 13.8, 89, 99; 137/494

[56] References Cited

UNITED STATES PATENTS

| | | | |
|---|---|---|---|
| 2,659,381 | 12/1953 | Seljos | 92/49 X |
| 2,801,067 | 7/1957 | Mercier | 138/30 X |
| 2,825,361 | 3/1958 | Seljos | 92/49 X |
| 3,042,068 | 7/1962 | Smith | 285/4 X |
| 3,075,499 | 1/1963 | Prather | 92/99 X |
| 3,148,702 | 9/1964 | Mercier | 138/30 X |
| 3,227,093 | 1/1966 | Taplin | 92/99 X |
| 3,776,267 | 12/1973 | Alley | 137/494 |

*Primary Examiner*—Richard E. Aegerter
*Assistant Examiner*—James E. Bryant, III
*Attorney, Agent, or Firm*—John O. Evans, Jr.

[57] ABSTRACT

A pressure transfer unit having a movable partition including a flexible bellows for separating an internal, controlled-pressure chamber from a reference-pressure chamber. A valve is provided for limiting the volume of liquid that can be injected into and received in the controlled-pressure chamber during filling or refilling thereof. A spring biases the partition to apply a predetermined force to the partition and to shut off fluid transfer in the event of bellows failure. The unit is arranged for simple and rapid assembly and disassembly.

11 Claims, 1 Drawing Figure

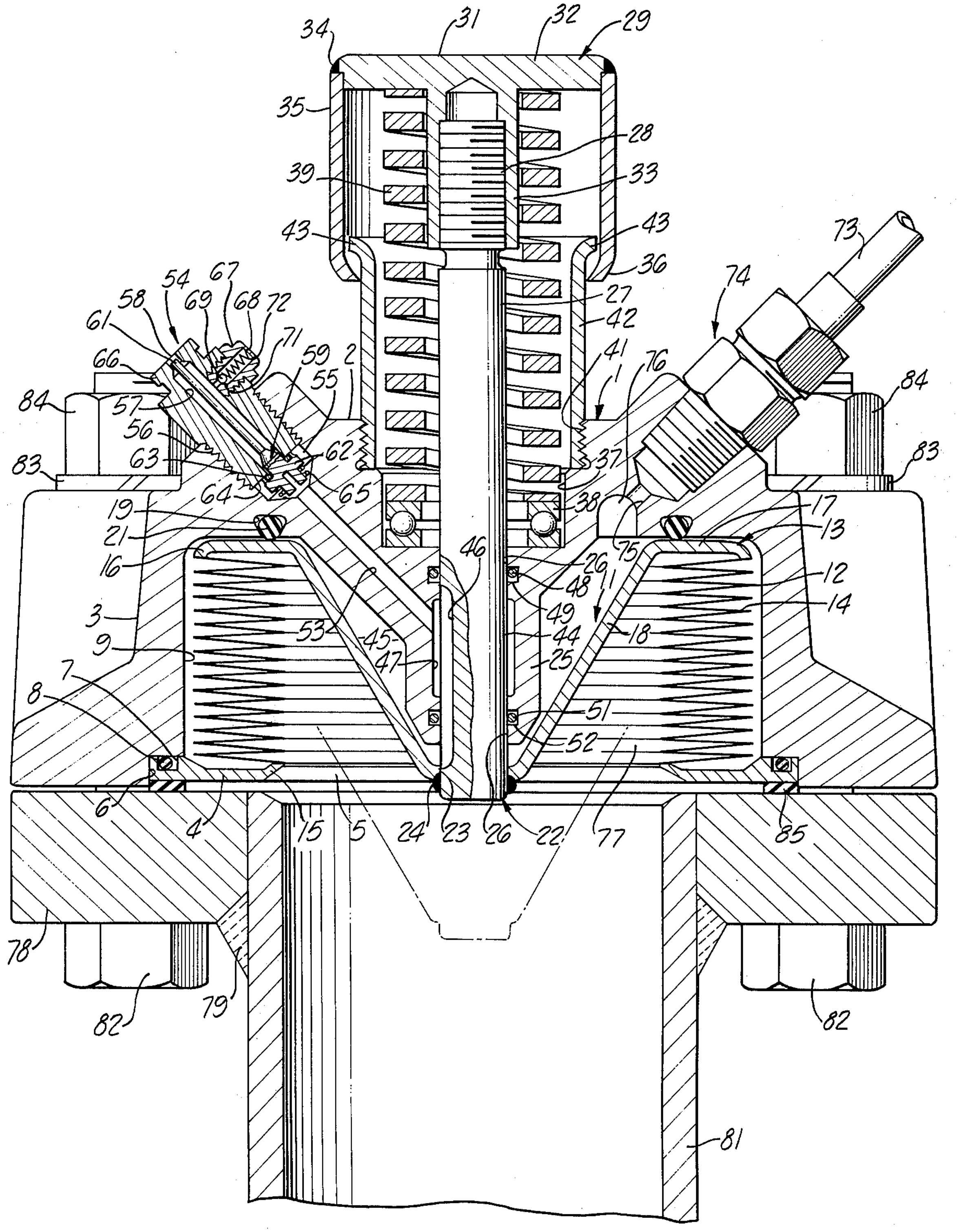
34
31
32
29
35
28
39
33
43
43
73
36
54
67
27
74
58
69
68
72
42
61
71
59
2
41
76
66
55
1
84
84
57
56
62
37
63
83
83
64
65
38
19
17
21
75
13
16
46
26
48
12
49
11
14
3
53
45
44
18
9
47
25
7
51
8
52
6
4
15
5
24
23
26
22
77
85
78
79
82
82
81

PRESSURE TRANSFER UNIT

BACKGROUND OF THE INVENTION

1. Field of the Invention

This invention relates to improved pressure transfer units, and more particularly to an improved pressure transfer unit for separating a fluid in a conduit or vessel from another fluid which is pressurized for various purposes, say, for example, to maintain a relationship of fluid pressure in vessels or conduits, while maintaining a positive barrier between the fluids; to transmit pressure in a pressure sensing device where the fluid being sensed must be excluded from the pressure indicating means; to act as a snubber for modulating pressure surges; to feed a liquid to a system at a controlled pressure; to accumulate fluid; to translate changes in pressure into mechanical action for operating various devices such as switches, solenoids, valves, and the like; and to provide a hydraulic piston.

2. Description of Certain Prior U.S. Applications

A pressurizing and cooling system for mechanical seals is shown and described in the pending application for U.S. Pat. filed June 29, 1972, Ser. No. 267,449, by Martinez et al., for "Pressurized Cooling System for Mechanical Seals," wherein a buffer fluid is pressurized in response to the pressure of fluid in a conduit, such as a pump intake, whereby the buffer fluid is maintained at a pressure in a double mechanical seal chamber greater than the pressure in the pump housing. The pressurizing systems disclosed in the Martinez et al. application employ pressure transfer units having elastomeric diaphragm assemblies. However, such diaphragm assemblies are not universally applicable due to the tendency of certain fluids to attack and/or penetrate the elastomeric material.

Another pressure transfer unit is shown and described in the application for U.S. Pat. filed Aug. 7, 1972, Ser. No. 278,475, by Charles H. Diehl. This pressure transfer unit also employs an elastomeric diaphragm assembly, and also is not universally applicable.

Still another pressure transfer unit is shown and described in the application for U.S. Pat. filed Sept. 7, 1972, Ser. No. 287,166, by Lee Joe Alley. This pressure transfer unit employs a pressure transferring separator having a metallic bellows. However, this unit has no means for limiting the quantity of fluid that can be pumped into it, and hence the bellows and other of its parts can be subjected to unduly high fluid pressures that may damage the bellows and other components of the unit. In order to partially meet this difficulty, the bellows should be especially rugged and strong to withstand any inadvertently applied excessive fluid pressures.

SUMMARY OF THE INVENTION

An object of this invention is to provide a pressure transfer unit that may not be overfilled with fluid.

Another object is to provide a pressure transfer unit that signals when the unit is full of fluid.

Another object is to provide a pressure transfer unit having a pressure-transmitting partition including a flexible bellows that is assured of not being overstressed when filling the unit with fluid.

Another object is to provide a pressure transfer unit that will shut off fluid transfer in the event of bellows failure.

Another object is to provide a pressure transfer unit that is easy to assemble and disassemble, as for replacement of worn or damaged parts.

The foregoing and other aims, objects and advantages of the invention are realized in a pressure transfer unit comprising: a housing having walls defining an internal cavity; partition means mounted in said cavity and sealed to said walls to divide said cavity into a first pressure chamber and a second pressure chamber, and being movable to expand and contract the volume of said first chamber; said walls providing first port means communicating with said first chamber and second port means communicating with said second chamber; spring means biasing said partition means to move in a direction to contract the volume of said first chamber; liquid conduit means through which liquid is introduced into said first chamber, thereby moving said partition means against the bias of said spring means in a direction to expand the volume of said first chamber; and valve means for limiting the volume of liquid introduced through said conduit means and received in said first chamber, said valve means having a stationary valve member and a cooperating movable valve member actuable to close said valve means in response to movement of said partition means in a direction to expand the volume of said first chamber and to a position corresponding to a preselected volume of said first chamber.

BRIEF DESCRIPTION OF THE DRAWING

In the drawing, the sole FIGURE is an axial sectional view of an exemplary pressure transfer unit in accordance with the invention, a moved position of certain of the parts being indicated by broken lines.

DESCRIPTION OF THE PREFERRED EMBODIMENT

Referring to the drawing, the pressure transfer unit shown has a housing 1 having the general form of a body of revolution about a vertical axis. The housing has a horizontal top wall 2 and a cylindrical side wall 3. The bottom wall includes a ring member 4 having a central opening 5. The ring member is received in a bore 6, and is provided with an O-ring groove 7 in its upper side in which an O-ring 8 is positioned to seal the ring member to the bore. The walls of the housing define an internal cavity 9 of cylindrical configuration.

A movable partition, designated by the general reference numeral 11, is mounted in and transversely of the cavity 9. This partition is provided by a flexible, metallic bellows 12 extending longitudinally in the cavity 9, and a rigid, metallic, discoid member 13 extending across the top of the bellows and transversely of the cavity. The bellows is of the welded type, being fabricated of a plurality of stacked, generally annular elements 14, welded at alternate outer and inner diameters to provide an hermetic structure. The inner edge of the bottom element of the bellows is welded to an upturned inner rim 15 of the ring member 4, and the outer edge of the top element is welded to a downturned outer rim 16 of the discoid member 13.

An annular horizontal flange 17, having a width slightly greater than the width of the annular bellows elements 14, is provided by the outer part of the disc member 13, and the central part of the discoid member is in the form of a truncated cone 18 that projects downwardly into the open, central portion of the bellows, and terminates adjacent to the bottom thereof.

The underside of the top wall 2 of the housing has an annular groove 19 formed therein, overlying the flange 17 and accommodating a rubber O-ring providing a valve seat that is engaged by the flange 17, in its uppermost position, as shown in the drawing. The flange functions as a valve head, and in cooperation with the O-ring 21, provides a valve that operates in a manner to be hereinafter described.

Rising axially from the center of the cone 18 is a stem 22 that is fitted in an opening 23 in the cone and is welded therein as indicated at 24. Depending centrally from the top wall 2 of the housing is a cylindrical boss 25 that extends into hollow interior of the cone 18. The boss has an axial bore 26 in which the stem 22 is slidable with a close fit. The stem has an extension 27, external to the housing 1, which is threaded at its distal end 28. A cap 29, having a body 31 with a circular crown 32 and an interiorly threaded, dependent portion 33, is screwed on the threaded end of the stem. Welded, as at 34, to the crown is a downwardly extending, cylindrical skirt 35 having an inturned rim 36 at its bottom.

An axial well 37 is provided in the top wall of the housing, and positioned therein is a ball thrust bearing 38 that encircles the stem 22. A helical spring 39 is mounted in compression between the top of the thrust bearing and the under side of the crown 32. The well 37 has an internally threaded counterbore 41 in which a tubular shroud 42 is threadedly mounted. As shown in the drawing, the shroud projects into the open bottom of the skirt 35, and has an outturned rim 43 overlapping the inturned rim 36 of the skirt. A free-sliding fit is provided between the cap 29 and the shroud 42. The overlapping arrangement of the rims 36 and 43 minimizes the entry of dirt and foreign particles into the interior of the cap and shroud.

Interiorly of the housing 1, the stem 22 has a portion 44 providing a movable valve member, the boss 25 providing a cooperating stationary valve member, these two members forming a valve for limiting the volume of liquid that can be injected into and received in an upper, internal chamber 45, defined between the movable partition 11 and the surrounding walls of the housing, as will be described more fully hereinafter. The stem portion 44 has a longitudinal slot 46 milled in one side thereof and providing a movable valve element. A cooperating stationary valve element is provided by an annular recess 47 cut in the bore 26 in which the stem portion 44 slides. The stem is slidably sealed in the bore 26 by an upper O-ring 48 located in a groove 49 in the boss 25 above the recess 47, and by a lower O-ring 51 located in another groove 52 below the recess.

A liquid-injection conduit 53, defined in the upper wall 2 and boss 25, communicates the recess 47 with the exterior of the housing through a pressure-relief, liquid-injection fitting 54. The conduit 53 is counterbored at its outer end to form an enlarged section 55 that is internally threaded at 56 to accept the fitting 54 that is complementally threaded. A fluid passasge 57 extends longitudinally through the fitting, and has an inlet-port 58. An inwardly opening, outwardly closing check valve 59 has its stem 61 slidably fitted in the passage 57 and its head 62 positioned in the counterbore 55. An O-ring 63 is carried by the check valve head and sealingly cooperates with a seat 64 on the fitting. A coil spring 65 is mounted in compression between the check valve head 62 and the bottom of the counterbore 55 to normally hold the check valve closed. The fitting 54 has a flange 66, to which a conventional grease gun (not shown) may be applied for the injection of grease, oil or other fluid into the upper internal chamber 45.

The fitting 54 has a pressure relief valve 67 threadedly mounted therein and communicating the fluid passage 57 with the exterior. This valve has a vent 68 extending through it. A ball check valve 69 is pressed into engagement with a seat 71 by a compression spring 72 in the vent 68.

A liquid conduit 73 provides fluid communication from the upper internal chamber 45 to the zone (not shown) to be pressurized. A coupling 74 connects the conduit 73 to the housing 1, as shown, and fluid communication of the coupling with the chamber 45 is completed through the coupling and through the fluid passages 75 and 76.

The pressure transfer unit shown has a lower internal chamber 77 defined by the interior of the bellows 12 and the discoid member 13. This pressure transfer unit is shown, by way of illustration, as being mounted on a flange 78 welded at 79 to the top of a riser pipe 81. Bolts 82,82 passing through aligned holes in the flange 78 and the housing 1, are provided with washers 83,83 and nuts 84,84 to fasten the pressure transfer unit to the flange. An annular gasket 85 seals the pressure transfer unit to the flange, and presses the annular ring member 4 into sealing engagement in the bore 6 when the nuts 84 are tightened.

The riser pipe 81 communicates the lower internal chamber 77 with a reference source of fluid pressure (not shown).

It will be seen from the description thus far that the internal cavity 9 of the pressure transfer unit is divided by the partition 11 into two chambers designated, respectively, as the upper and lower internal chambers 45 and 77.

Assuming that the zone to be pressurized through the liquid conduit 73 may be substantially closed, as for example the interior cavity of a double mechanical seal which leaks but slightly between its opposed sealing faces, the filling of the upper internal chamber 45 of the pressure transfer unit with oil, grease or other sealing fluid will now be described. A grease gun (not shown) containing oil, for example, is applied to the flange 66 of the fitting 54. The grease gun is operated to inject oil through the fitting into the liquid injection conduit 53, the check valve 59 opening to pass the oil. From the conduit 53, the oil flows into the annular recess 47, and thence through the slot 46 and around the bottom of the boss 25 into the chamber 45. As oil continues to be pumped into the chamber 45, it forces the discoid member 13 down against the bias of the helical spring 39, thereby shortening the spring and also contracting the bellows 12. The downward movement of the discoid member is limited to the position shown in broken lines in the drawing, by abutment of the inturned rim 36 of the skirt 35 of the cap with the upper surface of the top wall 2. When the discoid member is in its broken-line position, the top edge of the longitudinal slot 46 in the stem 22 is located adjacent to the bottom of the lower O-ring groove 52, and is thus positioned beneath the bottom edge of the annular recess 47 in the boss 25, and the valve elements 46 and 47 are in closed disposition. It is seen that the initial closing of the valve actually occurs at a point somewhat above the lowermost position of the discoid member 13, i.e., at a point where the top of the slot 46 is just beneath the bottom of the recess 47, and that a valve-closed condition obtains from this point to the lowermost position of the top edge of the slot 46.

Oil is injected until the valve elements 46,47 reach the initial closed position, thereby stopping the flow of oil into the upper chamber 45 and preventing its being overfilled. When the valve is closed, continued actuation of the grease gun causes the pressure relief valve 67 to open, and oil is forced out through the relief valve, thereby preventing the build-up of undue pressure in the oil injection channels and, incidentally, giving an indication that the upper chamber 45 is full. A visual indication of the amount of oil in the chamber is also afforded by the vertical position of the cap 29 on the shroud 42.

In operation, the discoid member 13 is ordinarily located above the initial closed position of the valve elements 46 and 47 and below the uppermost position illustrated in the drawing. In this range of positions, the valve elements 46 and 47 open, but the check valve 59 holds the pressure in the upper chamber 45 and prevents escape of oil. In operation, the controlled pressure in the chamber 45 is equal to the sum of the reference pressure existing in the lower internal chamber 77 and transmitted to the upper chamber by the movable partition 11, and the pressure engendered by the force of the helical spring 39. The need to refill to upper chamber 45 with oil is indicated by the position of the cap 29 on the shroud 42.

If a sudden loss of pressure should occur in the upper chamber due, for instance, to failure of the check valve 59 or mechanical failure downstream of the coupling 74, the force of the spring 39 and of the reference pressure in the lower chamber 77 will move the discoid member 13 to its uppermost position to thereby close the valve comprised of the flange 17 and the O-ring 21 at the top of the cavity 9. In the closed position of this valve, some of the oil in the upper chamber is trapped between the outside of the bellows 12 and the surrounding walls of the housing. Although the reference pressure inside the bellows may be relatively great, the bellows will not be subjected to any substantial pressure gradient thereacross, as the reference pressure is opposed by the incompressible oil trapped outside the bellows. Therefore, the bellows need be designed to withstand only the fluid pressures expected to be encountered in normal operation, and not the extreme pressure differences referred to above.

If the pressures above and below the partition 11 should become equalized, as upon the accidental failure of the bellows 14, the spring 39 would effect closure of the flange 17 against the O-ring 21 and prevent the flow of reference fluid from the riser pipe 81 and the lower chamber 77 into the upper chamber 45.

The pressure transfer unit of this invention, is constructed and arranged for ready disassembly for the replacement of worn parts, such as the O-rings 8, 48, 49 and 21, or for occasional cleaning. To this end, the fasteners 82, 83, 84 are released, and the unit is removed from the flange 78. The cap 29 is then unscrewed from the stem 22, the thrust bearing 38 allowing the helical spring 39 to rotate with the cap in order to facilitate its removal. After the cap has been removed, the spring 39 and the thrust bearing 38 may be withdrawn for cleaning and lubrication. The ring member 4, the bellows 12, the discoid member 13, and the stem 22 are then withdrawn as a unit through the opening at the bottom of the internal cavity 9. This opening has a diameter somewhat greater than the outside diameter of the bellows 12 to permit passage of the bellows therethrough. After cleaning and replacement of the worn O-rings, the unit is reassembled by merely reversing the foregoing steps.

From the foregoing description, it will be understood that the helical spring 39 is designed to exert a force on the partition 11 which will increase the pressure in the controlled pressure chamber 45 above the pressure in the reference pressure chamber 77 by a desired amount, depending upon the use to which the controlled pressure fluid is put. The force of the pressure relief valve spring 72 will be selected to permit the relief valve to open when the fluid injection pressure exceeds the normal pressure in the controlled pressure chamber 45 by a small amount, so that excessive pressure will not be imposed in the chamber 45 when it is being filled with fluid.

From the foregoing, it is seen that the invention provides a fluid pressure transfer unit that accomplishes the objects of the invention. Changes and modification in the preferred embodiment will be apparent to those skilled in the art without departing from the spirit and scope of the invention as defined in the following claims.

I claim:

1. A pressure transfer unit comprising: a housing having walls defining an internal cavity; partition means mounted in said cavity and sealed to said walls to divide said cavity into a first pressure chamber and a second pressure chamber, and being movable to expand and contract a volume of said first chamber; said walls providing first port means for communicating said first chamber with a zone to be pressurized and second port means for communicating said second chamber with a reference source of fluid pressure; spring means biasing said partition means to move in a direction to contract the volume of said first chamber; liquid conduit means through which liquid is introduced into said first chamber, thereby moving said partition means against the bias of said spring means in a direction to expand the volume of said first chamber; valve means for limiting the volume of liquid introduced through said conduit means and received in said first chamber, said valve means having a stationary valve member and a cooperating movable valve member mounted on said partition means and actuable to close said valve means in response to movement of said partition means in a direction to expand the volume of said first chamber and to a position corresponding to a preselected volume of said first chamber, and conduit closure means in said liquid conduit means operable to close said liquid conduit means for preventing the flow of liquid outwardly from said first chamber through said liquid conduit means.

2. A pressure transfer unit as defined in claim 1, wherein said movable valve member is actuable to open said valve means in response to movement of said partition means from said position and in a direction to contract said first chamber.

3. A pressure transfer unit as defined in claim 2, wherein said stationary valve member comprises a cylinder carried by said housing, said movable valve member comprises a stem portion carried by said partition means and reciprocable in said cylinder in response to said movements of said partition means, and said cylinder and said stem portion have valve elements cooperable to close and open said valve means.

4. A pressure transfer unit as defined in claim 3, wherein said conduit closure means comprise check-valve means.

5. A pressure transfer unit as defined in claim 4, including pressure relief port means in said liquid conduit means.

6. A pressure transfer unit as defined in claim 3, wherein said partition means includes a rigid plate and a flexible bellows having one end and an other end sealed at one end to said plate and at the other end to said walls.

7. A pressure transfer unit as defined in claim 6, wherein said movable valve member is mounted on said rigid plate and has an extension projecting outwardly from said housing, said spring means comprising a coil spring surrounding said extension, and means mounting said coil spring in compression between said extension and said housing.

8. A pressure transfer unit as defined in claim 7, including a cap member, thread means removably connecting said cap member to said extension, said coil spring being mounted between said cap member and said housing, and thrust bearing means supporting said coil spring on said housing.

9. A pressure transfer unit as defined in claim 8, wherein said walls comprise a ring member in part defining said second pressure chamber and being separable from said walls, means sealing said ring member to said walls, said ring member providing said second port means, and said flexible bellows sealed at the said other end to said ring member.

10. A pressure transfer unit as defined in claim 6, wherein said walls comprise valve seat means circumscribing said first port means, and said rigid plate comprises valve head means movable with said partition means into sealing engagement with said valve seat means to close said first port means.

11. A pressure transfer unit as defined in claim 9, wherein said ring member, said flexible bellows, said rigid plate, and said movable valve member with its said extension are arranged to be withdrawn as a unit from said walls following unthreading of said cap member from said extension.

* * * * *